(12) United States Patent
Kim et al.

(10) Patent No.: US 9,128,667 B2
(45) Date of Patent: Sep. 8, 2015

(54) PROTECTIVE COVER FOR SLOT AND SCREEN OF MOBILE TERMINAL

(71) Applicant: Samsung Electronics Co., Ltd., Gyeonggi-do (KR)

(72) Inventors: Namsu Kim, Seoul (KR); Jinsoo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 185 days.

(21) Appl. No.: 14/012,126

(22) Filed: Aug. 28, 2013

(65) Prior Publication Data

US 2014/0063709 A1   Mar. 6, 2014

(30) Foreign Application Priority Data

Aug. 29, 2012  (KR) .......................... 10-2012-0094624

(51) Int. Cl.

| G06F 1/16 | (2006.01) |
|---|---|
| H05K 5/00 | (2006.01) |
| H05K 7/00 | (2006.01) |
| H05K 7/20 | (2006.01) |
| A45C 11/00 | (2006.01) |

(52) U.S. Cl.
CPC .............. *G06F 1/1626* (2013.01); *A45C 11/00* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| 5,969,940 | A * | 10/1999 | Sano et al. ............... 361/679.52 |
|---|---|---|---|
| 6,862,175 | B1 * | 3/2005 | McClendon et al. .... 361/679.31 |
| 7,233,489 | B2 * | 6/2007 | Toyama et al. .......... 361/679.31 |
| 7,916,468 | B2 * | 3/2011 | Takizawa ................ 361/679.44 |
| 8,164,891 | B2 * | 4/2012 | Liu .......................... 361/679.32 |
| 8,538,479 | B2 * | 9/2013 | Lee et al. ..................... 455/557 |
| 8,542,495 | B1 * | 9/2013 | Gorman et al. .............. 361/752 |
| 2002/0063162 | A1 * | 5/2002 | Endejan et al. .............. 235/486 |
| 2005/0111174 | A1 * | 5/2005 | Jordan .......................... 361/681 |
| 2008/0225471 | A1 * | 9/2008 | Takizawa ..................... 361/681 |
| 2009/0303676 | A1 * | 12/2009 | Behar et al. ............ 361/679.27 |
| 2009/0314400 | A1 | 12/2009 | Liu |
| 2010/0045628 | A1 | 2/2010 | Gettemy et al. |
| 2010/0046156 | A1 * | 2/2010 | Wei ......................... 361/679.32 |
| 2010/0061054 | A1 * | 3/2010 | Ladouceur et al. ...... 361/679.56 |
| 2010/0091455 | A1 * | 4/2010 | Tang ....................... 361/679.58 |
| 2011/0002096 | A1 * | 1/2011 | Thorson .................. 361/679.04 |
| 2011/0007461 | A1 * | 1/2011 | Moskowitz et al. ..... 361/679.01 |

(Continued)

FOREIGN PATENT DOCUMENTS

DE   20 2010 006 517 U1   10/2010
WO         02/44878 A1    6/2002

*Primary Examiner* — Hoa C Nguyen
*Assistant Examiner* — Xanthia C Cunningham
(74) *Attorney, Agent, or Firm* — Cha & Reiter, LLC

(57) ABSTRACT

A protective cover for a slot and a screen provided in a mobile terminal is provided. The protective cover for a slot and a screen of a mobile terminal having a window at a front surface, having a slot in a recess formed in a predetermined depth at an upper portion of a rear surface, and mounts an injection and discharge element in the slot includes: a slot protective cover for covering the injection and discharge element and fastened to the recess; and a screen protective cover extended in a length for covering the window from the slot protective cover and for rotating to the front surface or the rear surface using one side surface of the mobile terminal as a central axis.

21 Claims, 13 Drawing Sheets

(56) References Cited

U.S. PATENT DOCUMENTS

| | | | |
|---|---|---|---|
| 2011/0063779 A1* | 3/2011 | Ochi et al. ............... | 361/679.01 |
| 2011/0163642 A1 | 7/2011 | Rohrbach et al. | |
| 2011/0222238 A1* | 9/2011 | Staats et al. .............. | 361/679.55 |
| 2012/0106078 A1* | 5/2012 | Probst et al. ............. | 361/679.56 |
| 2012/0127642 A1* | 5/2012 | Rolus Borgward ...... | 361/679.01 |
| 2012/0182740 A1* | 7/2012 | Vermeulen .................... | 362/253 |
| 2012/0293953 A1* | 11/2012 | Wu et al. .................. | 361/679.56 |
| 2013/0021738 A1* | 1/2013 | Yang et al. ............... | 361/679.27 |
| 2013/0077235 A1* | 3/2013 | Pawar et al. ............. | 361/679.56 |
| 2013/0107449 A1* | 5/2013 | Su et al. .................... | 361/679.56 |
| 2013/0155589 A1* | 6/2013 | Takabayashi ............ | 361/679.01 |
| 2014/0038533 A1* | 2/2014 | Zhuang et al. ............... | 455/90.2 |
| 2014/0049909 A1* | 2/2014 | Zhu et al. ................ | 361/679.55 |

* cited by examiner

PROTECTIVE COVER FOR SLOT AND SCREEN OF MOBILE TERMINAL

CROSS RELATED APPLICATION

This application claims the benefit of priority under 35 U.S.C. §119(a) of a Korean patent application filed on Aug. 29, 2012 in the Korean Intellectual Property Office and assigned Serial No. 10-2012-0094624, the entire disclosure of which is hereby incorporated by reference.

BACKGROUND

1. Field of the Invention

The present disclosure relates to a protective cover of a mobile terminal, and more particularly, to a protective cover that covers a window or screen of the mobile terminal or supports the mobile terminal.

2. Description of the Related Art

In general, a tablet personal computer (PC), which is one of typical mobile terminals is manipulated using a touch screen instead of a keyboard or a mouse. The tablet PC is less convenient than a netbook computer or a laptop computer, but is more portable than a netbook computer or a laptop computer and thus a demand of students or office workers for the tablet PC has arisen.

Tablet PC that are available today include the Galaxy Tab from Samsung Electronics, iPad from Apple Inc., Identity tab from KT, BlackBerry Playbook from Blackberry, Slate from Hewlett-Packard, Folio 100 from Toshiba, Asus Eeepad from Asus, i-station Z3D from I-STATION Corp., and Optimus pad from LG Electronics.

In order to provide various services such as authentication, charging of fees, and a security function to a mobile communication service subscriber, such a tablet PC typically has a subscriber identification module (SIM) card or a universal subscriber identity module (USIM) card that stores individual information.

Further, the tablet PC often has at least one storage medium such as a security digital (SD) card, micro-SD memory card, mini SD memory card, compact flash (CF) card, memory stick (MS) card, smart media (SM) card, and/or multimedia card (MMC) as a memory card that stores and provides information. Such mobile terminals are typically capable of accepting and ejecting such a SIM card, USIM card, and memory card. Hereinafter, an element to be accepted and ejected into and from the mobile terminal, such as the SIM card, USIM card, and memory card are generically referred to as an injection and discharge element.

As the conventional art, referring to FIG. 1, a plurality of injection and discharge elements are mounted, separated by a predetermined gap at a plurality of slots, respectively, formed at an edge of the mobile terminal. In order to prevent separation and movement of the injection and discharge element, a slot protective cover for covering an exposed portion of the slot and the injection and discharge element is provided in every slot.

However, because the enhanced slot protective covers are formed to be separated in plural at an exposed outer surface of the mobile terminal, each slot protective cover protrudes to a predetermined height from a surface of the mobile terminal.

Due to the protruded shape of the slot protective cover, the slot protective cover may be damaged by a friction or an impact from the outside. Further, due to a shape of the slot protective cover formed to be separated at each location of the mobile terminal, the mobile terminal cannot have a pleasing appearance. Further, when producing the mobile terminal, several parts are necessary and, as a result costs for processing for a mold and mass production increases.

As the mobile terminal has a large display, a weight of the mobile terminal increases and it is inconvenient to use the mobile terminal while carrying for a long time, and because the mobile terminal has a panel shape of the exposed display, when carrying the mobile terminal, the display may be easily broken.

In order to solve such a problem, as shown in FIG. 1, when storing the mobile terminal, the conventional protective cover is formed in a structure that protects a window or screen of the mobile terminal and encloses an entire mobile terminal in order to use as a stand of the mobile terminal.

However, because an enhanced protective cover encloses the entire mobile terminal, the protective cover increases a thickness of the mobile terminal and provides a crude appearance. Further, a method of supporting the mobile terminal using the protective cover is inconvenient and a method in which a user opens and closes the protective cover is also inconvenient.

Therefore, a protective cover that safely protects an injection and discharge element and that does not detract from an otherwise pleasing appearance of the mobile terminal while not increasing a thickness of the mobile terminal when mounting the protective cover and that enables to easily store and carry the mobile terminal is requested.

SUMMARY

The present disclosure has been made in view of the above problems, and provides a protective cover for a slot and a window or screen provided in a mobile terminal that can safely protect an injection and discharge element and a slot provided in the mobile terminal from external friction or impact.

The present disclosure further provides a protective cover for an injection and discharge element, slot, and screen provided in a mobile terminal that does not have an influence on operation of the mobile terminal.

The present disclosure further provides a protective cover for an injection and discharge element, slot, and screen provided in a mobile terminal that that can provide a simple and enhanced external appearance to a surface of the mobile terminal.

In accordance with an aspect of the present invention, a protective cover for a slot and a screen of a mobile terminal having a screen at a front surface, having a slot in a recess formed to a predetermined depth at an upper portion of a rear surface, and mounts an injection and discharge element in the slot includes: a slot protective cover for covering the injection and discharge element and fastened to the recess; and a screen protective cover extended in a length for covering the screen of the mobile terminal from the slot protective cover and for rotating to the front surface or the rear surface using one side surface of the mobile terminal as a central axis.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
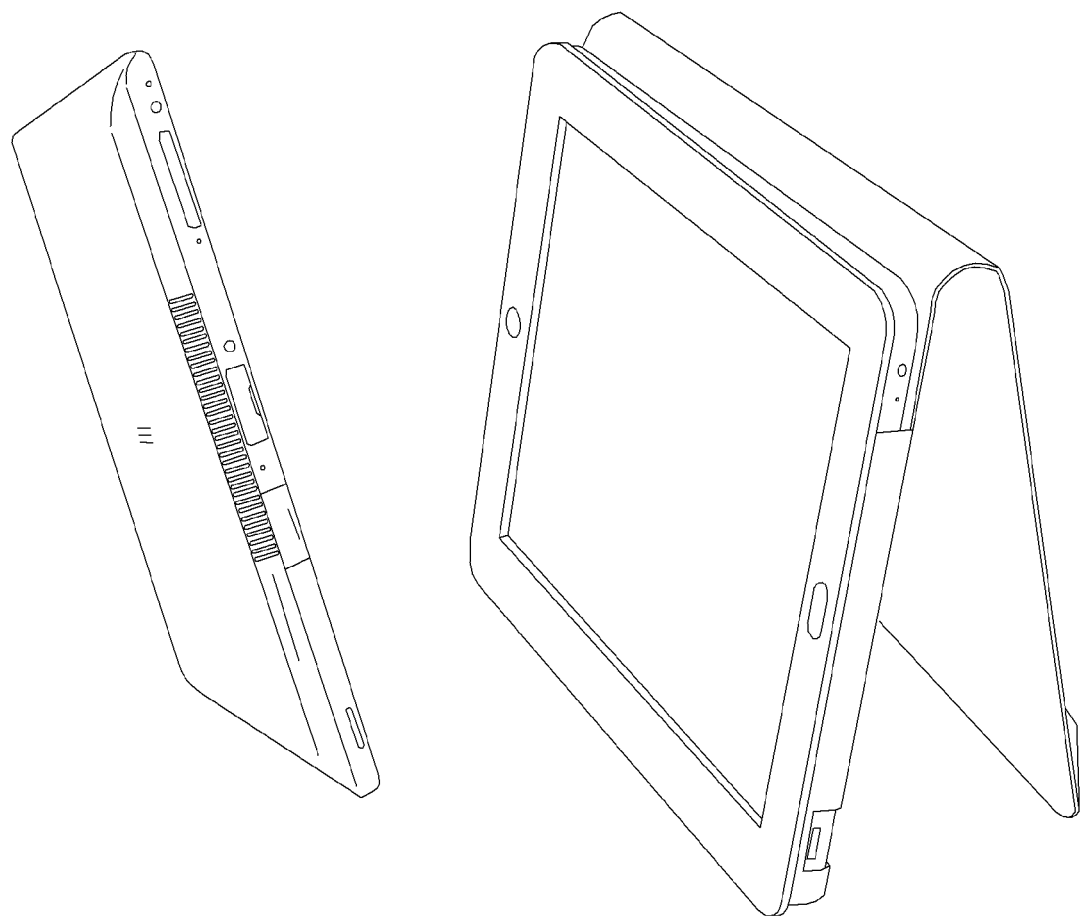
FIG. 1 is a perspective view illustrating a conventional mobile terminal and slot protective cover.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

A slot protective cover of a mobile terminal according to an exemplary embodiment of the present invention protects an injection and discharge element and a slot in which the injection and discharge element is mounted, and a screen protective cover extended from the slot protective cover protects a screen or supports the mobile terminal.

More particularly, a protective cover for a slot and a screen according to the present exemplary embodiment can protect a plurality of injection and discharge elements and slots in which the injection and discharge elements are mounted in an integral form at one time without increasing a thickness of the mobile terminal due to the protective cover, can have a self stand function, and be conveniently stored and used.

Figure 2:
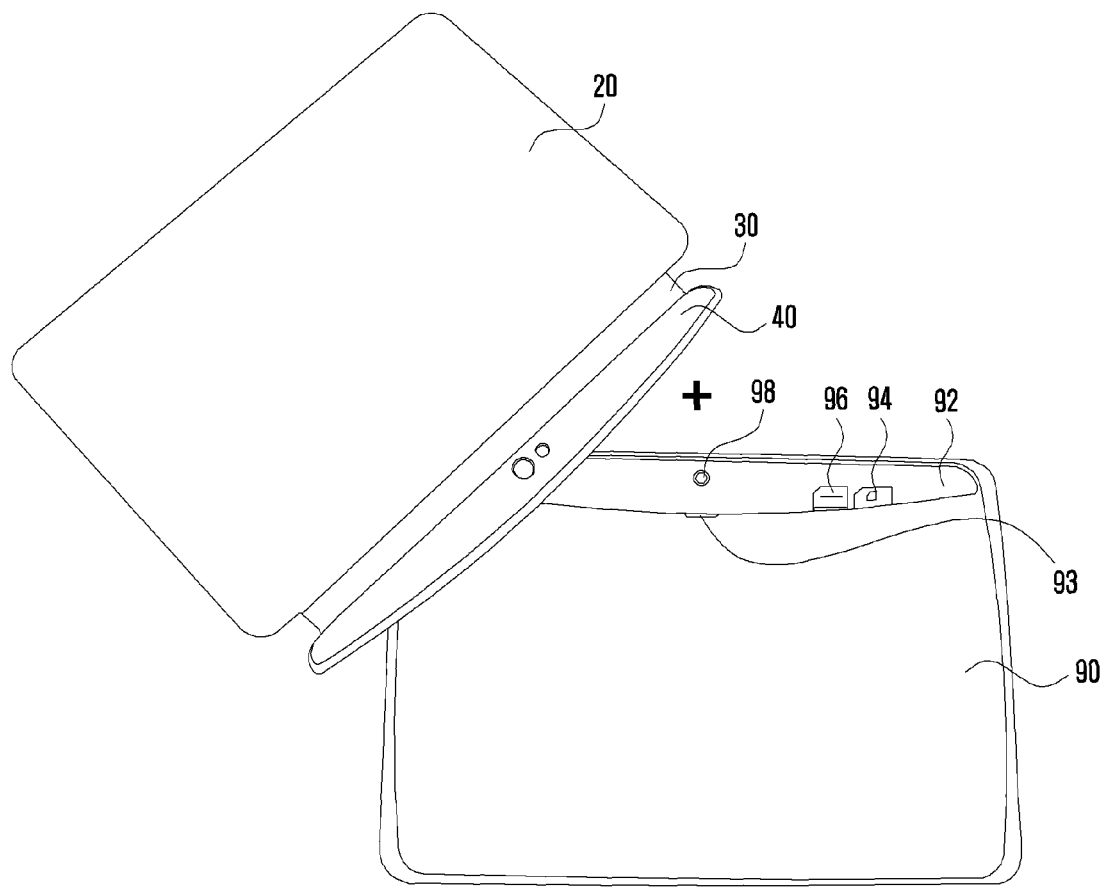
FIG. 2 is a perspective view illustrating a separated structure before a protective cover for a slot and a screen is mounted in a main body of a mobile terminal according to an exemplary embodiment of the present invention.

FIG. 2 is a perspective view illustrating a protective cover for a slot and a window (or a screen) provided in a mobile terminal according to an exemplary embodiment of the present invention and is a perspective view illustrating a separated structure before a protective cover for a slot and a screen is mounted in a main body of the mobile terminal.

Specifically, FIG. 2 illustrates a rear surface 90, a slot protective cover 40, and a screen protective cover 20 of a mobile terminal according to an exemplary embodiment of the present invention.

The rear surface 90 of the mobile terminal includes a recess 92 formed to a predetermined depth in an upper portion of the rear surface 90, a camera 98 provided within the recess 92, a plurality of slots 94 and 96 for mounting injection and discharge elements, and an auxiliary recess 93.

The injection and discharge element is formed to be inserted into and ejected from the mobile terminal and may generally be a card type element as described herein. The injection and discharge element may be a subscriber identification module (SIM) card or a universal subscriber identity module (USIM) card that stores individual information to provide various services such as authentication, collection of data for assessing fees, and a security function to, for example, a mobile communication service subscriber.

Further, the injection and discharge element may be a memory card for storing and providing information and may be a storage medium such as a security digital (SD) card, micro-SD memory card, mini SD memory card, compact flash (CF) card, memory stick (MS) card, smart media (SM) card, and multimedia card (MMC).

The recess 92 is formed in a predetermined depth in an upper portion of the rear surface 90 of the mobile terminal. A width and length of the recess 92 is formed according to a width and length of the mobile terminal, but it is preferable that a width and length thereof are a width and length that can mount the injection and discharge element.

At the inside of the recess 92, the camera 98, the injection and discharge element, and a marking area are provided. The marking area displays information of the mobile terminal, for example information about reliability or quality warranty and a serial number.

The plurality of slots 94 and 96 are preferably areas for mounting the injection and discharge elements. The plurality of slots 94 and 96 are preferably separated by a predetermined gap from each other. The plurality of slots 94 and 96 are recessed according to a thickness of the injection and discharge element mounted within the recess 92.

Particularly, the plurality of slots 94 and 96 according to the present exemplary embodiment are formed at a partial surface of an upper portion of the rear surface 90, unlike slots provided at an edge of a general mobile terminal shown in FIG. 1.

Conventionally, as a slot was provided at an edge of the mobile terminal, the slot and an injection and discharge element were exposed to an external friction or impact. However, a plurality of slots 94 and 96 according to the present exemplary embodiment are provided in the recess 92 formed within a rear surface 90 and are covered by the slot protective cover 40, thereby being protected from the outside. That is, the slots 94 and 96 of the present exemplary embodiment can be more safely protected, compared with when the slot and injection and discharge element are provided at an edge.

The auxiliary recess 93 is used for withdrawing the slot protective cover 40 from the recess 92 and is engraved in a predetermined depth in a portion of an edge of the recess 92. For example, the auxiliary recess 93 may be formed to withdraw the slot protective cover 40 by latching the slot protective cover 40 through the auxiliary recess 93 with a user's finger nail or a thin pin.

Figure 3:
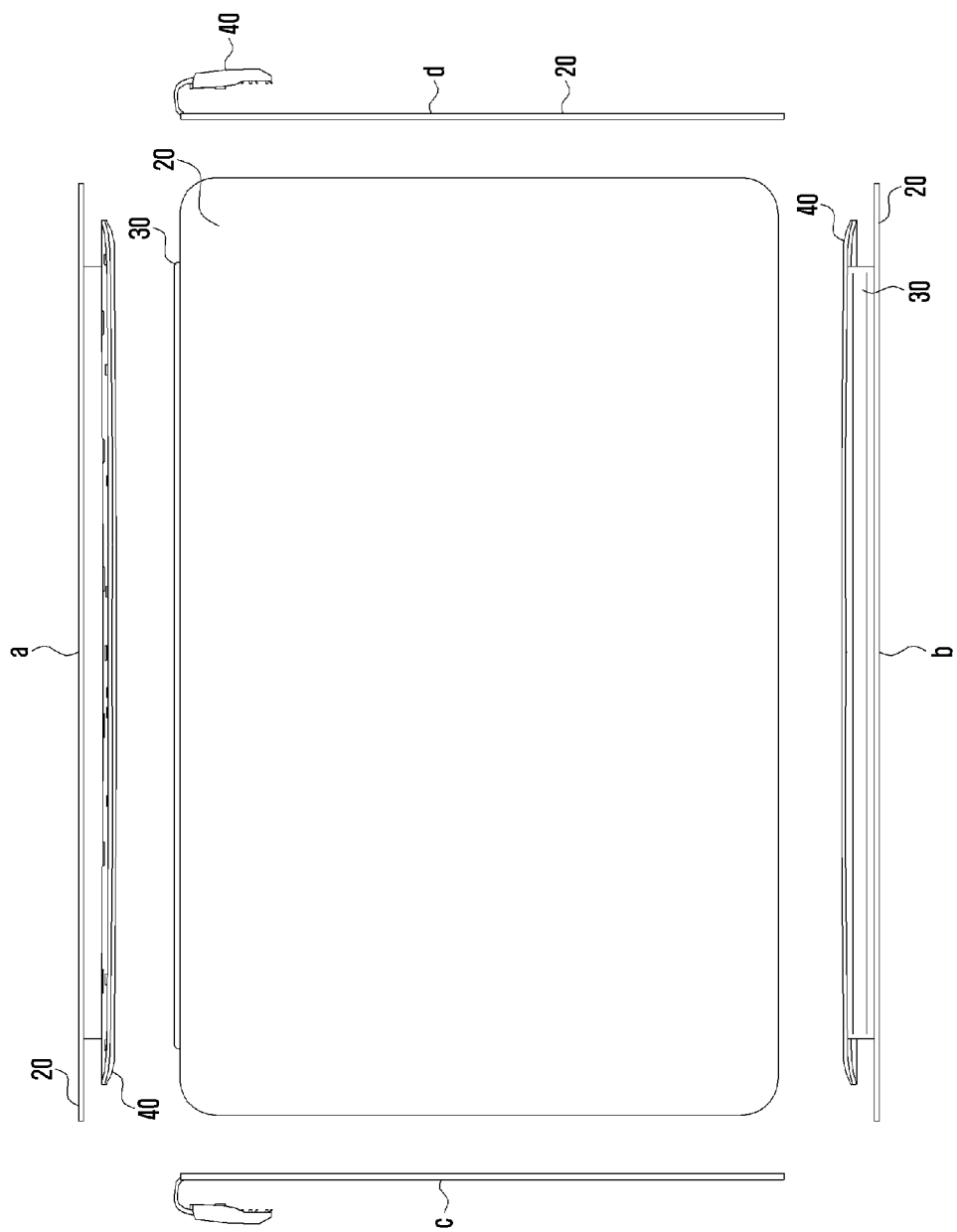
FIG. 3 is a view illustrating the upper side, lower side, left side, right side, and front side of a structure in which a slot protective cover and a screen protective cover are fastened of FIG. 2.
Figure 4:
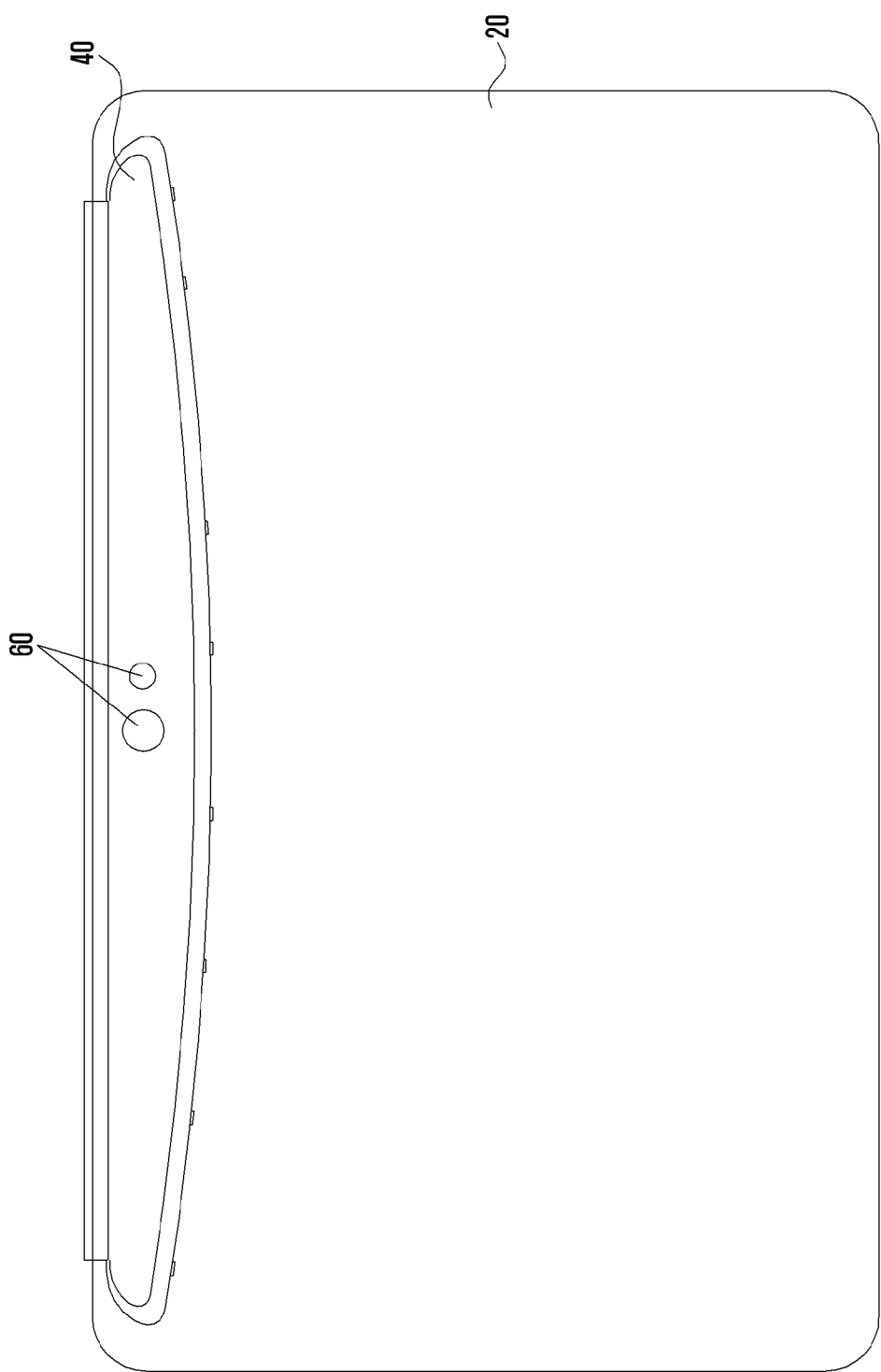
FIG. 4 is a rear view illustrating a structure in which a slot protective cover and a screen protective cover are fastened of FIG. 3.

FIG. 3 is a view illustrating the upper side, lower side, left side, right side, and front side of a structure in which a slot protective cover and a screen protective cover are fastened of FIG. 2, and FIG. 4 is a rear view illustrating a structure in which a slot protective cover and a screen protective cover are fastened of FIG. 3.

Referring to FIGS. 3 and 4, the slot protective cover 40 and the screen protective cover 20 are connected to each other. The slot protective cover 40 is designed to be fastened at a rear surface of the mobile terminal, and the screen protective cover 20 is rotatably or hingedly connected to a front surface or a rear surface of the mobile terminal.

The screen protective cover 20 is extended in a length that covers a screen from the slot protective cover 40. The screen protective cover 20 may be formed in a structure extended integrally with the slot protective cover 40 or may be formed in a structure detachable from the slot protective cover 40. A length of a lower edge of the slot protective cover 40 from an upper edge of the mobile terminal may be smaller than that of the screen protective cover 20 and is a length that can mount over the injection and discharge element.

The screen protective cover 20 may be formed integrally with the same material as that of the slot protective cover 40, or may be formed separately with a material different from that of the slot protective cover 40, and may be joined by a connection member 30 provided between the screen protective cover 20 and the slot protective cover 40.

The slot protective cover 40 may be made of a nonmetallic material to prevent an influence on transmission and reception of a signal of an antenna (not shown) mounted in the mobile terminal.

The slot protective cover 40 may include a predetermined opening 60 for exposing a camera and a flash lamp provided in the mobile terminal.

When the mobile terminal is being used, the screen protective cover 20 can rotate to be adjacent to a rear surface of the mobile terminal. When the mobile terminal is not used, the screen protective cover 20 can protect the screen by covering a front surface of the screen. The screen protective cover 20 is made of a material that can support a weight of the mobile terminal when an edge of the screen protective cover 20 contacts with the surface below the mobile terminal. The material of the screen protective cover 20 is not limited by the present invention, however the material may preferably be one of rubber, urethane, silicone, leather and fiber or may be a combined material of rubber, urethane, silicone, leather and fiber and may be formed by injecting a hard material into the material.

Further, at a surface in which the screen protective cover 20 contacts or touches the screen, typically at least one material of chamois, synthetic leather, microfiber, and suede may be attached. Although such materials are preferred, any material can be used, but preferably, the material is one that will not scratch or otherwise mar the screen.

The connection member 30 connects the slot protective cover 40 and the screen protective cover 20. In order to rotate the screen protective cover 20 to a front surface or a rear surface of the mobile terminal, the connection member 30 is made of a material having predetermined elasticity and flexibility, for example, the connection member 30 may be made of at least one material of rubber, urethane, silicone, leather and fiber.

The connection member 30 may be connected to the screen protective cover 20 through a bonding method of one of adhesive, bonding, hook, fusion-bonding, and zipper and may be detachably coupled to the screen protective cover 20, and a coupling method is not limited thereto.

As the screen protective cover 20 is preferably detachably coupled to the slot protective cover 40, by separating the slot protective cover 40 from the screen protective cover 20, as needed, the slot protective cover 40 may be individually mounted on the mobile terminal with or without the screen protective cover 20.

Because the slot protective cover 40 is fastened to a rear surface of the mobile terminal, an additional member for fastening the slot protective cover 40 to the mobile terminal may not be further needed. If desired, such additional members can be any type of fastener, e.g., tongue and groove or magnet.

Figure 5A:
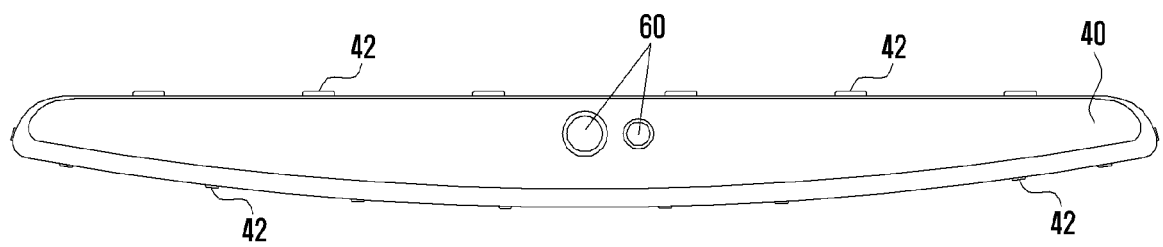
FIGS. 5A and 5B are enlarged views illustrating a front surface and a rear surface of a slot protective cover of FIG. 3.
Figure 5B:
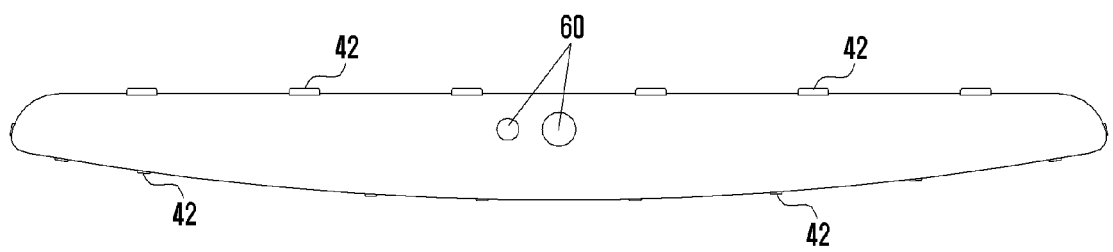
Figure 6:
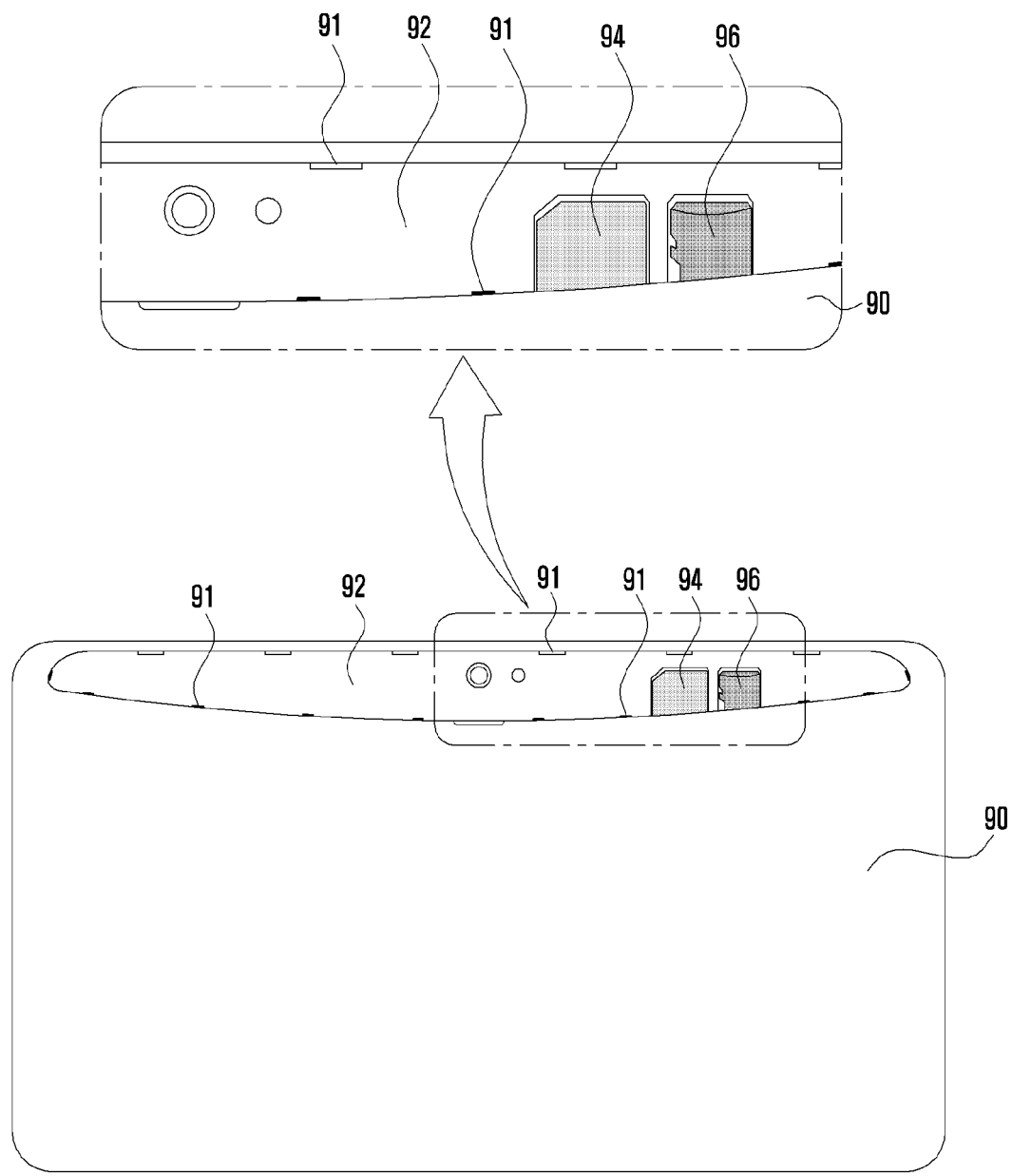
FIG. 6 is an enlarged view illustrating a rear surface of a mobile terminal and an internal structure of a recess formed in the mobile terminal according to an exemplary embodiment of the present invention.

FIGS. 5A and 5B are enlarged views of a preferred embodiment, illustrating a front surface and a rear surface of the slot protective cover 40 of FIG. 3, and FIG. 6 is an enlarged view illustrating a rear surface of a mobile terminal and an internal structure of the recess 92 formed in the mobile terminal according to an exemplary embodiment of the present invention.

Referring to FIGS. 5A, 5B, and 6, the slot protective cover 40 includes at least one hook 42 formed in a size that can be fastened to the recess 92 and separated by a predetermined gap at an edge circumference.

The hook 42 faces at least one hook groove 91 formed with separated by a predetermined gap at an edge circumference of a bottom surface of the recess 92. The slot protective cover 40 can be fastened to the recess 92 by coupling of the hook 42 provided in the slot protective cover 40 and the hook groove 91 formed in the recess 92.

Specifically, in a fastening method, the slot protective cover 40 is first inserted into an upper end portion of the recess 92, and the hooks 42 are fastened to the hook groove 91 by uniformly pressing the hooks 42 provided at an edge of the slot protective cover 40.

It is preferable that the hook 42 and the hook groove 91 are detachably formed. This is because the injection and discharge element mounted in the slots 94 and 96 should be able to be injected and discharged from the mobile terminal and thus in order to inject and discharge the injection and discharge element, the slot protective cover 40 that covers the injection and discharge element should be able to be detached in case the slot protective cover 40 blocks the inject and discharge operations.

Preferably, the slot protective cover 40 according to the present exemplary embodiment is integrally formed at a rear surface of the mobile terminal, and the slot protective cover 40 is fastened to a recess recessed to a predetermined depth from the rear surface of the mobile terminal. Accordingly, the slot protective cover 40 does not protrude much from the surface of the mobile terminal.

Alternatively, the slot protective cover 40 may be fastened to the recess 92 using a magnetic force through a magnet. That is, a first magnet is attached to or mounted in the recess 92. A second magnet may be attached to the slot protective cover 40 facing thereto. At least one first magnet may be attached to the recess 92, and at least one second magnet may be attached to slot protective cover 40 and face the first magnet.

Conventionally, because a slot protective cover should be provided in every slot, the slot protective covers are formed with separated at edges of the mobile terminal.

In contrast, the slot protective cover 40 according to the present exemplary embodiment preferably covers a plurality of slots by the slot protective cover 40 which is integrally formed.

Because several slots are preferably covered by a single slot protective cover 40, the mobile terminal can provide an enhanced external appearance. Further, by reducing the number of parts for several slots, the costs related to production process can be reduced.

Figure 7:
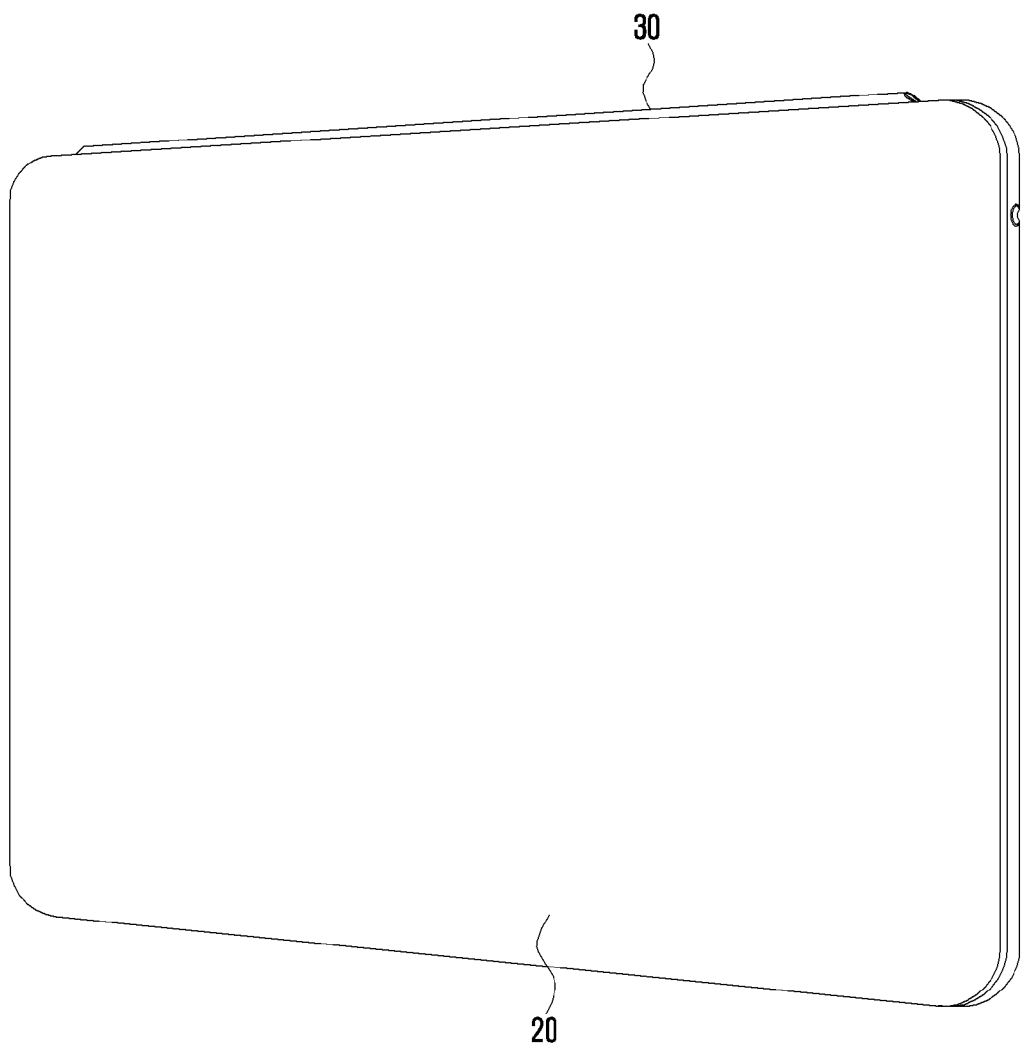
FIG. 7 is a front perspective view illustrating a structure of a slot protective cover and a screen protective cover mounted in a mobile terminal of FIG. 3.
Figure 8:
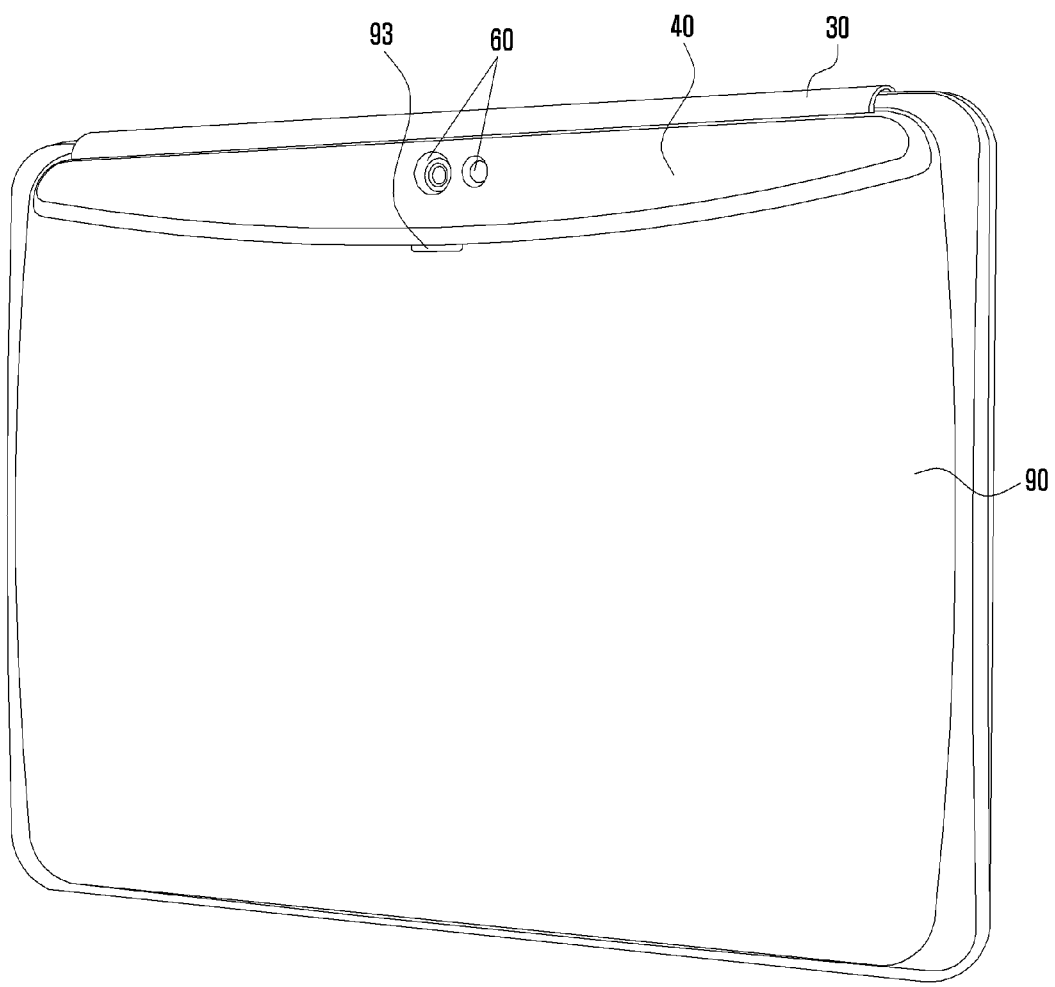
FIG. 8 is a rear perspective view illustrating a structure of a slot protective cover and a screen protective cover mounted in a mobile terminal of FIG. 3.

FIG. 7 is a front perspective view illustrating a structure of a preferred slot protective cover 40 and a screen protective cover 20 mounted in a mobile terminal of FIG. 3, and FIG. 8 is a rear perspective view illustrating a structure of a slot protective cover and a screen protective cover mounted in a mobile terminal of FIG. 3.

The screen protective cover 20 shown in FIGS. 7 and 8 contacts the screen of the mobile terminal. When the screen of the mobile terminal is not being used, i.e., when the mobile terminal is carried or stored, the screen protective cover 20 close contacts with the screen to protect the screen. Alternatively, the screen protective cover 20 does not contact the screen of the mobile terminal when in the position as shown in FIG. 7, but merely covers the screen, preventing foreign objects from contacting the screen.

Figure 9:
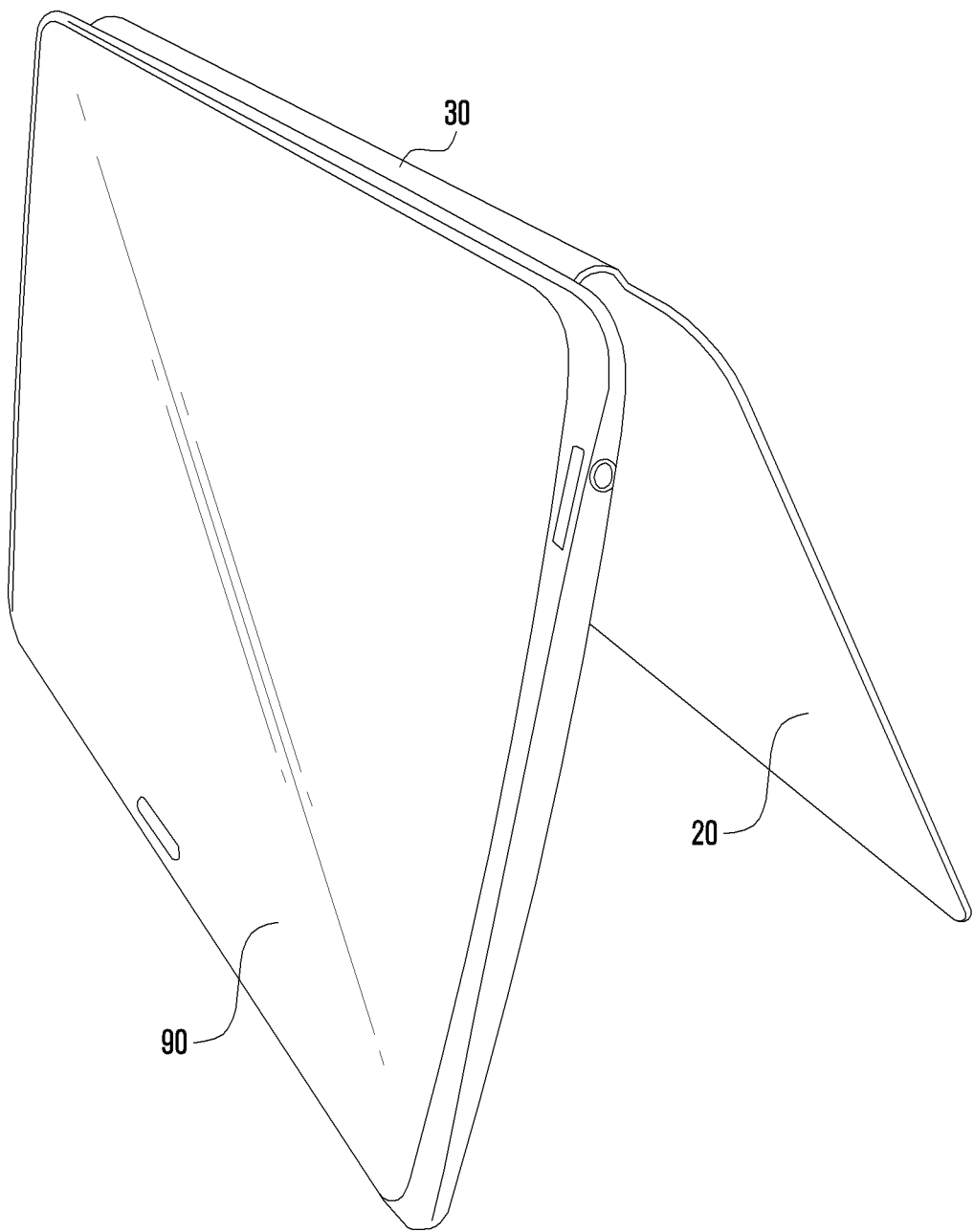
FIG. 9 is a perspective view illustrating a structure of a slot protective cover and a screen protective cover mounted in a mobile terminal of FIG. 3.

FIG. 9 is a perspective view illustrating a structure of a slot protective cover and a screen protective cover mounted in a mobile terminal of FIG. 3.

Referring to FIG. 9, when using the screen of the mobile terminal, the screen protective cover 20 can be rotated about one side surface of the mobile terminal such that it abuts a rear surface of the mobile terminal, allowing for exposure of the screen. A partial edge of the screen protective cover 20 can be rotated such that it contacts with the surface below the mobile terminal and supports the mobile terminal.

At a portion of an edge of the screen protective cover 20 contacting with the surface below the mobile terminal, a pad (not shown) for relieving an impact and for preventing a sliding movement may further included. The pad may be formed with rubber, silicone or any other material capable of relieving impact, or combinations thereof. In one embodiment, the material is selected to provide a degree of friction, preventing the mobile terminal from sliding along the surface below the mobile terminal.

Figure 10:
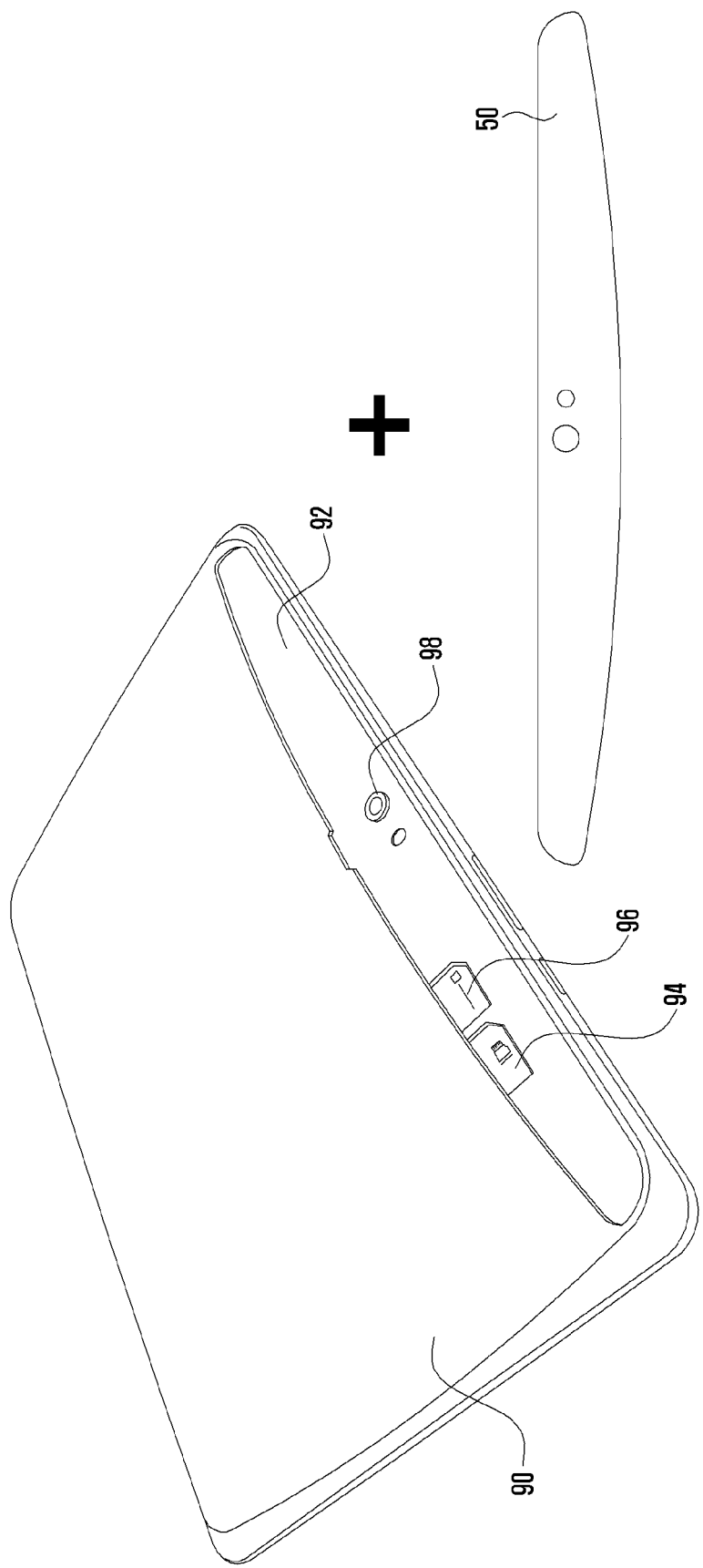
FIG. 10 is a perspective view illustrating a structure of a single type slot protective cover and a mobile terminal for mounting the single type slot protective cover according to an exemplary embodiment of the present invention.
Figure 11:
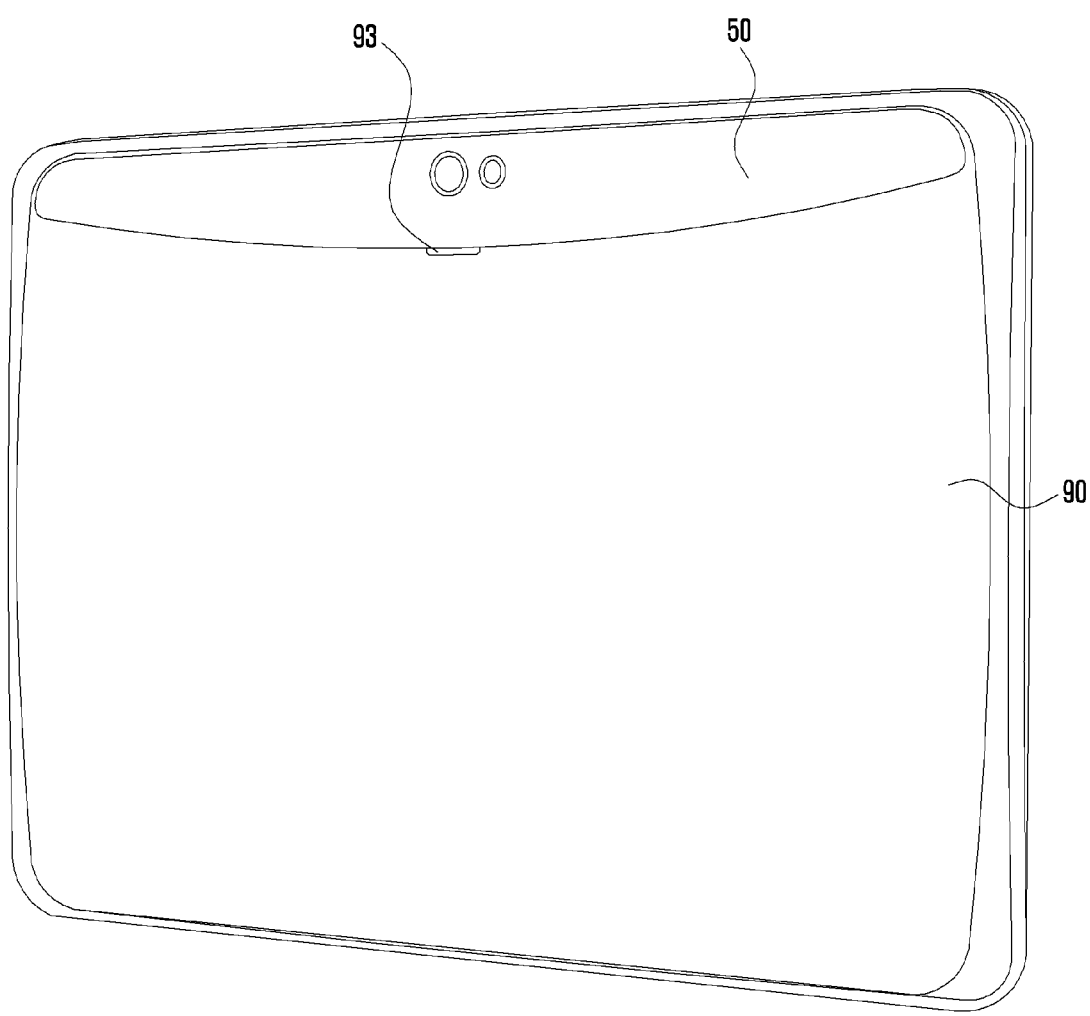
FIG. 11 is a perspective view illustrating a structure in which a single type slot protective cover is fastened to a mobile terminal according to an exemplary embodiment of the present invention.

FIG. 10 is a perspective view illustrating a structure of a single type slot protective cover and a mobile terminal for mounting the single type slot protective cover according to an exemplary embodiment of the present invention. FIG. 11 is a perspective view illustrating a structure in which a single type slot protective cover is fastened to a mobile terminal according to an exemplary embodiment of the present invention, and FIG. 12 is a side view illustrating a structure in which the single type slot protective cover is fastened to the mobile terminal of FIG. 11.

Figure 12:
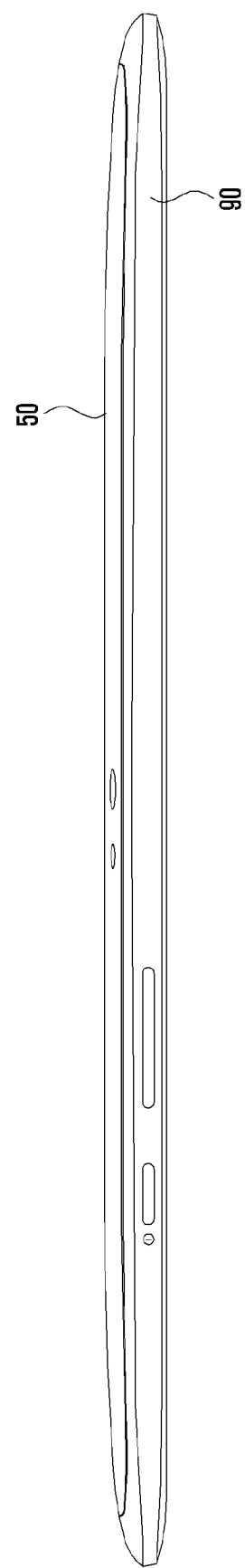
FIG. 12 is a side view illustrating a structure in which the single type slot protective cover is fastened to the mobile terminal of FIG. 11.

Referring to FIGS. 10 to 12, a slot protective cover 50 according to the present exemplary embodiment may be formed in a single type slot protective cover 50, except for the screen protective cover 20 and the connection member 30, unlike the foregoing exemplary embodiment. The slot protective cover 40 of the foregoing exemplary embodiments may be an extension type slot protective cover 40 further including the connection member 30 and the screen protective cover 20.

A structure and function of the single type slot protective cover 50 are almost the same as those of the slot protective cover 40 described with reference to FIGS. 2 to 9, and the single type slot protective cover 50 has a structure in which the connection member 30 and the screen protective cover 20 are not connected and therefore a detailed description thereof is omitted.

The single type slot protective cover 50 is not connected to the screen protective cover 20, and thus the mobile terminal has a smaller thickness and a simplified production process.

When the single type slot protective cover 50 is mounted in the recess 92, the single type slot protective cover 50 has the same height as that of a side wall of the recess 92 and thus, a surface of the single type slot protective cover 50 fastened to the recess 92 can be smoothly connected to a surface of the mobile terminal.

In an exemplary embodiment of the present invention, the mobile terminal may be applied to information and communication devices and multimedia devices such as a tablet personal computer (PC), mobile communication terminal, mobile phone, personal digital assistant (PDA), smart phone, international mobile telecommunication 2000 (IMT-2000) terminal, code division multiple access (CDMA) terminal, wideband code division multiple access (WCDMA) terminal, global system for mobile communication (GSM) terminal, general packet radio service terminal (GPRS), enhanced data GSM environment (EDGE) terminal, universal mobile telecommunication service (UMTS) terminal, digital broadcasting terminal, automated teller machine (ATM), and applications thereof. As can be seen, the present invention is capable of being used in combination with any type of portable communication device, and is not limited by the particular technology used by the terminal to communicate with other devices.

Further, the present invention can be applied to various kinds of mobile terminals having any shape or form factor, such as a bar type, flip type, folder type, sliding type, rotating type, and combination type thereof.

As described above, a protective cover for a slot and a screen provided in a mobile terminal according to the present invention preferably covers the injection and discharge element and the slot provided at a rear surface of the mobile terminal with a slot protective cover, thereby safely protecting the injection and discharge element and the slot from an external friction or impact.

Further, by detachably connecting a slot protective cover and a screen protective cover, the slot protective cover can be used as a single type slot protective cover or an extension type slot protective cover.

Further, by fastening a slot protective cover to a recess formed at a rear surface of the mobile terminal, a portion protruded from a surface of the mobile terminal is not formed and thus the mobile terminal can provide a smooth surface.

Further, by covering and protecting a plurality of injection and discharge elements and slots at one time with an integral slot protective cover, reliability of the protective cover can be improved, and by simplifying a production process, a cost can be reduced.

Further, when carrying and storing the mobile terminal, by rotating a screen protective cover to a front surface of the mobile terminal, the screen protective cover contacts with the screen, and thus the screen protective cover can protect the screen, and when using the mobile terminal, by rotating the screen protective cover to a rear surface of the mobile terminal, the screen protective cover can support the mobile terminal by contacting the surface below the mobile terminal and a user can use the mobile terminal with easy manipulation.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A protective cover for a slot and a screen of a mobile terminal, the mobile terminal having a screen at a front surface, a slot in a recess formed to a predetermined depth at an upper portion of a rear surface, and mounts an injection and discharge element in the slot, the protective cover comprising:
- a slot protective cover for covering the injection and discharge element and fastened to the recess; and
- a screen protective cover extended in a length for covering the screen of the mobile terminal from the slot protective cover and for rotating to the front surface or the rear surface using one side surface of the mobile terminal as a central axis.

2. The protective cover of claim 1, wherein the slot protective cover is detachably coupled to the recess.

3. The protective cover of claim 2, wherein the slot protective cover comprises a hook facing a hook groove separated by a predetermined gap at an edge circumference of the recess, and when the hook is latched to the hook groove, the slot protective cover is fastened to the recess.

4. The protective cover of claim 2, wherein the slot protective cover is fastened to the recess by a magnetic force between a first magnet attached to the recess and a second magnet attached to the slot protective cover facing the first magnet.

5. The protective cover of claim 1, wherein the slot is recessed in a depth that can mount the injection and discharge element within the recess.

6. The protective cover of claim 1, wherein the injection and discharge element is a card type element that can withdraw and be inserted from and into the mobile terminal.

7. The protective cover of claim 6, wherein the injection and discharge element is at least one of a memory card, universal subscriber identity module (USIM) card, and subscriber identity module (SIM) card.

8. The protective cover of claim 1, wherein the screen protective cover is configured to rotate to a rear surface of the mobile terminal when the mobile terminal is used, such that an edge thereof contacts with a surface below the mobile terminal and supports the mobile terminal.

9. The protective cover of claim 1, wherein the screen protective cover contacts with the screen by rotating to a front surface of the mobile terminal when the mobile terminal is not used to protect the screen.

10. The protective cover of claim 1, wherein the slot protective cover and the screen protective cover are connected using one side surface corresponding to an upper portion of the mobile terminal as a central axis.

11. The protective cover of claim 1, wherein a length of a lower edge of the slot protective cover from an upper edge of the mobile terminal is smaller than that of the screen protective cover and is a length that can mount over the injection and discharge element.

12. The protective cover of claim 1, wherein the screen protective cover is detachably connected to the slot protective cover.

13. The protective cover of claim 1, further comprising a connection member connected between the slot protective cover and the screen protective cover, and rotatably connecting the screen protective cover to the front surface or the rear surface of the mobile terminal about one side surface of an upper portion of the mobile terminal.

14. The protective cover of claim 13, wherein the connection member is detachably connected to the slot protective cover and the screen protective cover.

15. The protective cover of claim 1, wherein the slot protective cover is made of a nonmetallic material, and the screen protective cover and the connection member are formed with at least one of rubber, urethane, silicon, leather, and fiber.

16. The protective cover of claim 1, wherein the recess comprises a marking area for displaying information of the mobile terminal at one side thereof.

17. The protective cover of claim 1, wherein the mobile terminal further comprises an auxiliary recess having a structure for withdrawing the slot protective cover from the recess being depressed a predetermined depth in a portion of an edge of the recess.

18. The protective cover of claim 1, wherein the slot protective cover comprises at least one opening, sized and shaped to expose at least one of a camera and a flash lamp of the mobile terminal.

19. A mobile terminal comprising:
- a screen on a front side of the mobile terminal;
- at least one injection and discharge element positioned in a recess on a rear side of the mobile terminal; and
- a slot protective cover releasably positioned in the recess,
- a screen protective cover sized and shaped to protect the screen of the mobile terminal, hingedly connected to the slot protective cover.

20. The mobile terminal of claim 19, wherein the screen protective cover comprises a screen contact surface, the screen contact surface comprising at least one of chamois, synthetic leather, microfiber, and suede.

21. The mobile terminal of claim 19, further comprising:
- a camera having a lens positioned within the recess, wherein the slot protective cover has an aperture sized and shaped to expose the lens.

* * * * *